(No Model.)

W. L. CROWSON.
COTTON GIN.

No. 314,917. Patented Mar. 31, 1885.

5 Sheets—Sheet 1.

(No Model.) 5 Sheets—Sheet 3.
W. L. CROWSON.
COTTON GIN.

No. 314,917. Patented Mar. 31, 1885.

(No Model.)

5 Sheets—Sheet 4.

W. L. CROWSON.
COTTON GIN.

No. 314,917. Patented Mar. 31, 1885.

Witnesses.
Robert Everett
J. A. Rutherford

Inventor.
William L. Crowson.
By James L. Norris.
Atty.

(No Model.) 5 Sheets—Sheet 5.

W. L. CROWSON.
COTTON GIN.

No. 314,917. Patented Mar. 31, 1885.

Witnesses:
Robert Everett
J. A. Rutherford

Inventor:
William L. Crowson
By James L. Norris
Atty.

ns to roughly gathered, trashy, and hully cot-
UNITED STATES PATENT OFFICE.

WILLIAM L. CROWSON, OF MEMPHIS, TENNESSEE, ASSIGNOR TO THE MILBURN GIN AND MACHINE COMPANY, OF SAME PLACE.

COTTON-GIN.

SPECIFICATION forming part of Letters Patent No. 314,917, dated March 31, 1885.

Application filed September 11, 1884. (No model.)

*To all whom it may concern:*

Be it known that I, WILLIAM L. CROWSON, a citizen of the United States, residing at Memphis, Shelby county, Tennessee, have invented new and useful Improvements in Cotton-Gins, of which the following is a specification.

This invention relates to improvements in cotton-gins; and has for its objects to render the ginning mechanism more efficient in use on roughly gathered, trashy, and hully cotton; to provide means whereby the hulling-rollers are revolved by a flat belt capable of being conveniently tightened while the machine is in operation; to provide novel means for adjusting the seed-board vertically and forward and backward to change the shape of the roll-box according to the condition of the cotton to be operated upon; to provide novel means for adjusting the hulling-rollers to and from the gin-saws while the machine is in operation for obtaining the best results on different grades of cotton; to provide novel and simple means for facilitating the hulling operations of the machine; to provide mechanism for raising and lowering the gin-ribs or gin-breast while the machine is in operation to vary the depth or projection of the gin-saws in the roll-box, and to admit of the roll-box being raised clear of the saws, whereby the attendant avoids danger if it becomes necessary to introduce the hands in the roll-box; and, finally, to place all the adjusting mechanisms under control of the attendant, so that the parts can be adjusted while the gin is running, thus avoiding loss of time resulting from stopping the machine for such purpose, and also preventing injury to the operator in making the adjustments. These objects I accomplish in the manner and by the mechanism hereinafter described and claimed, reference being made to the accompanying drawings, in which—

Figure 1:
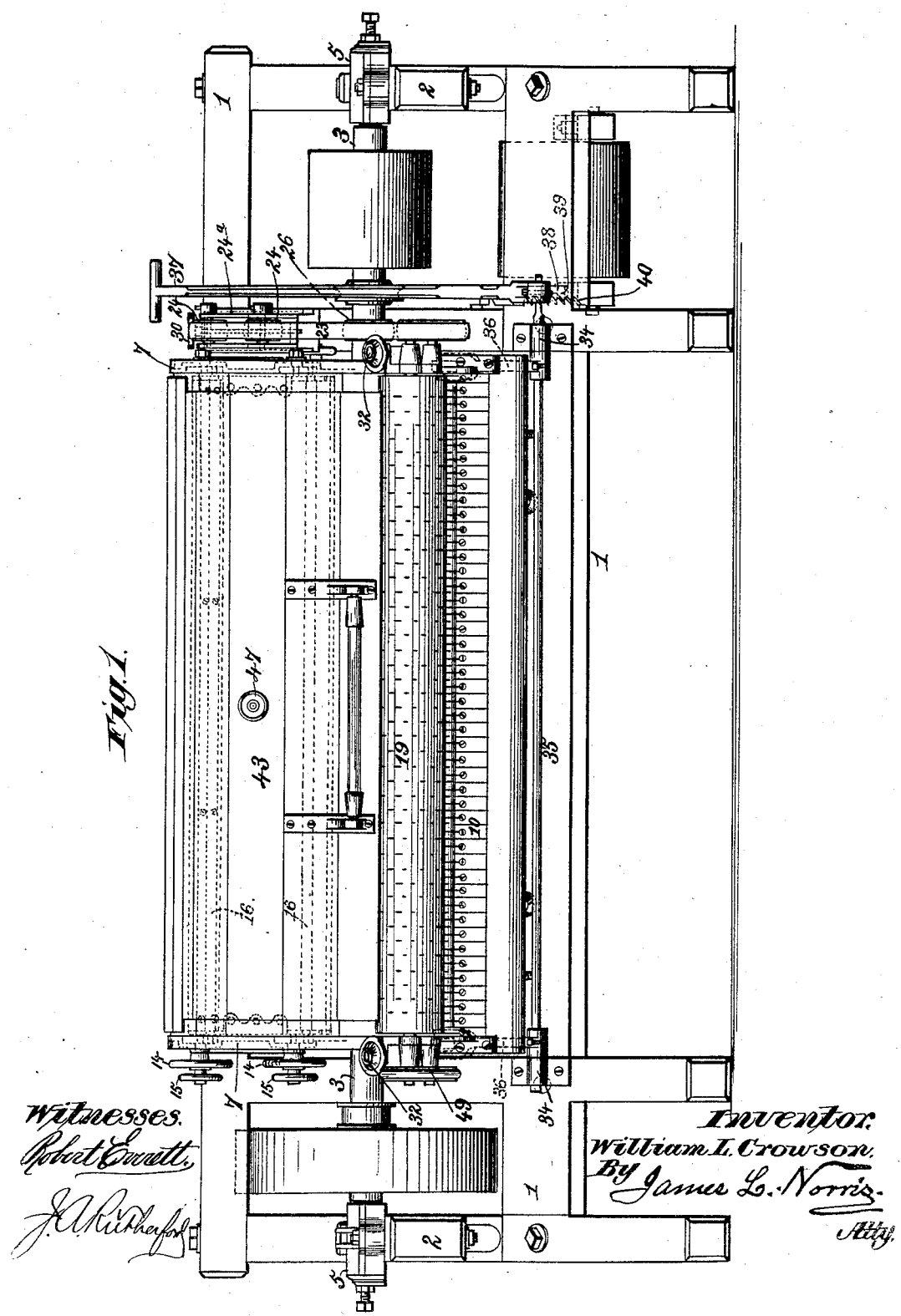
Figure 2:
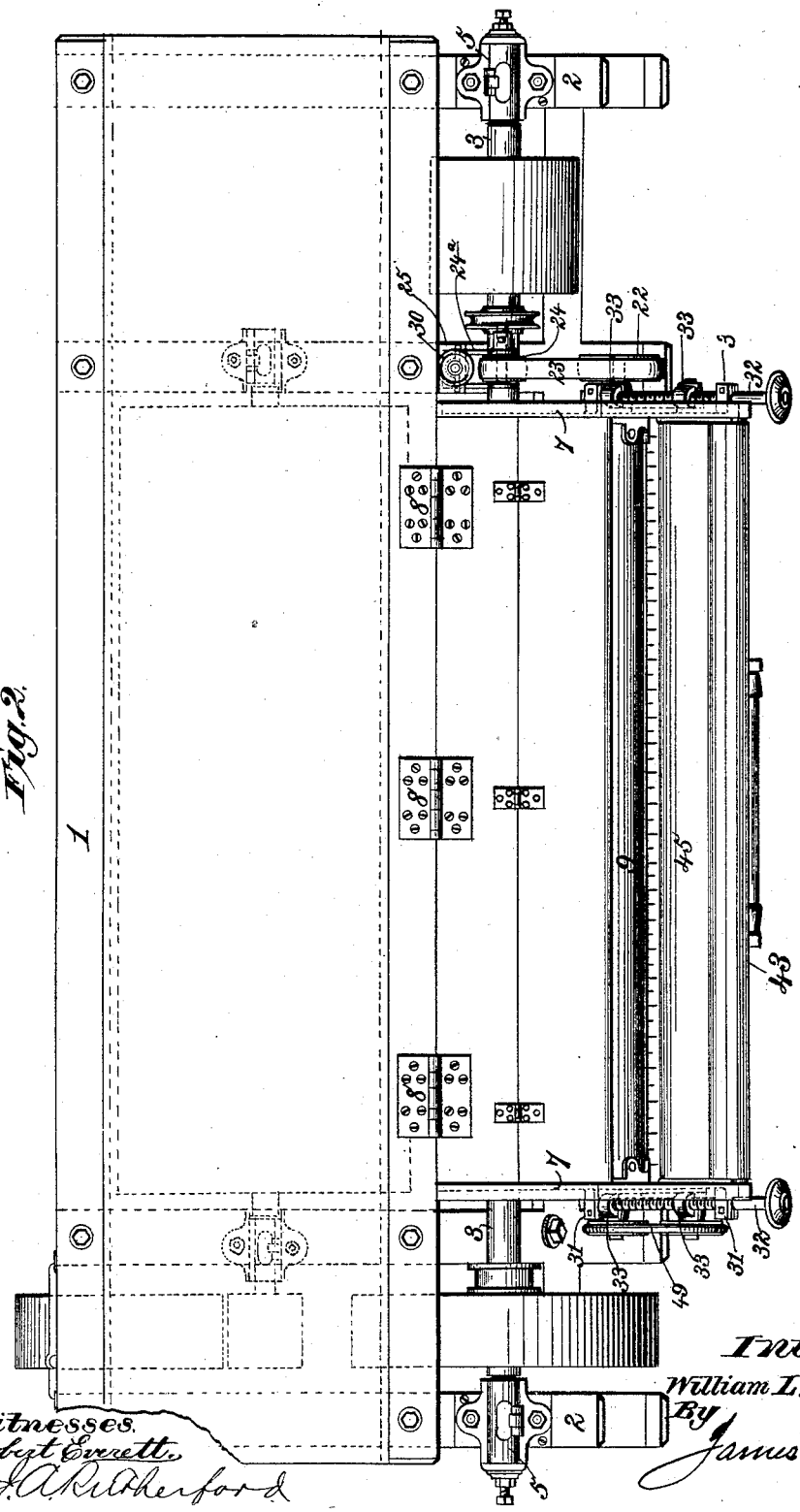
Figure 3:
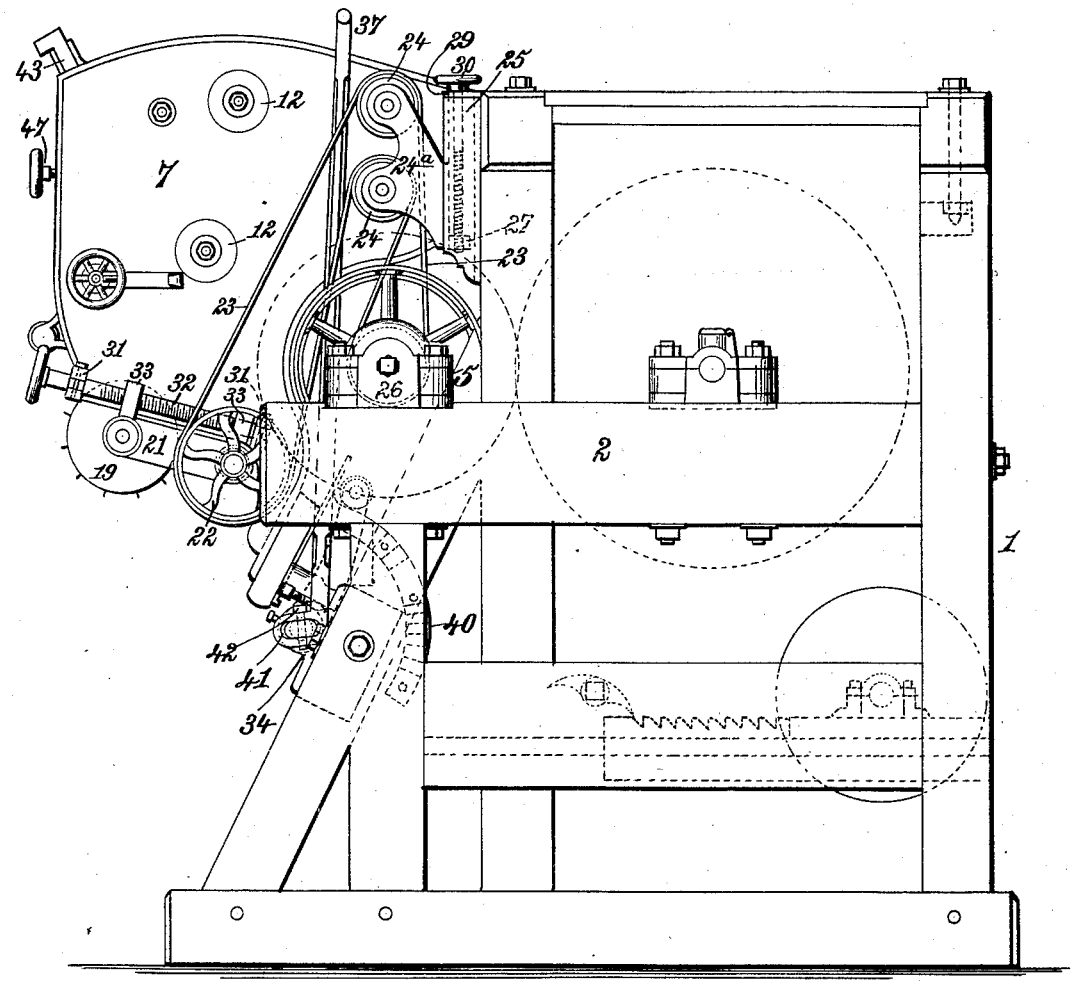
Figure 4:
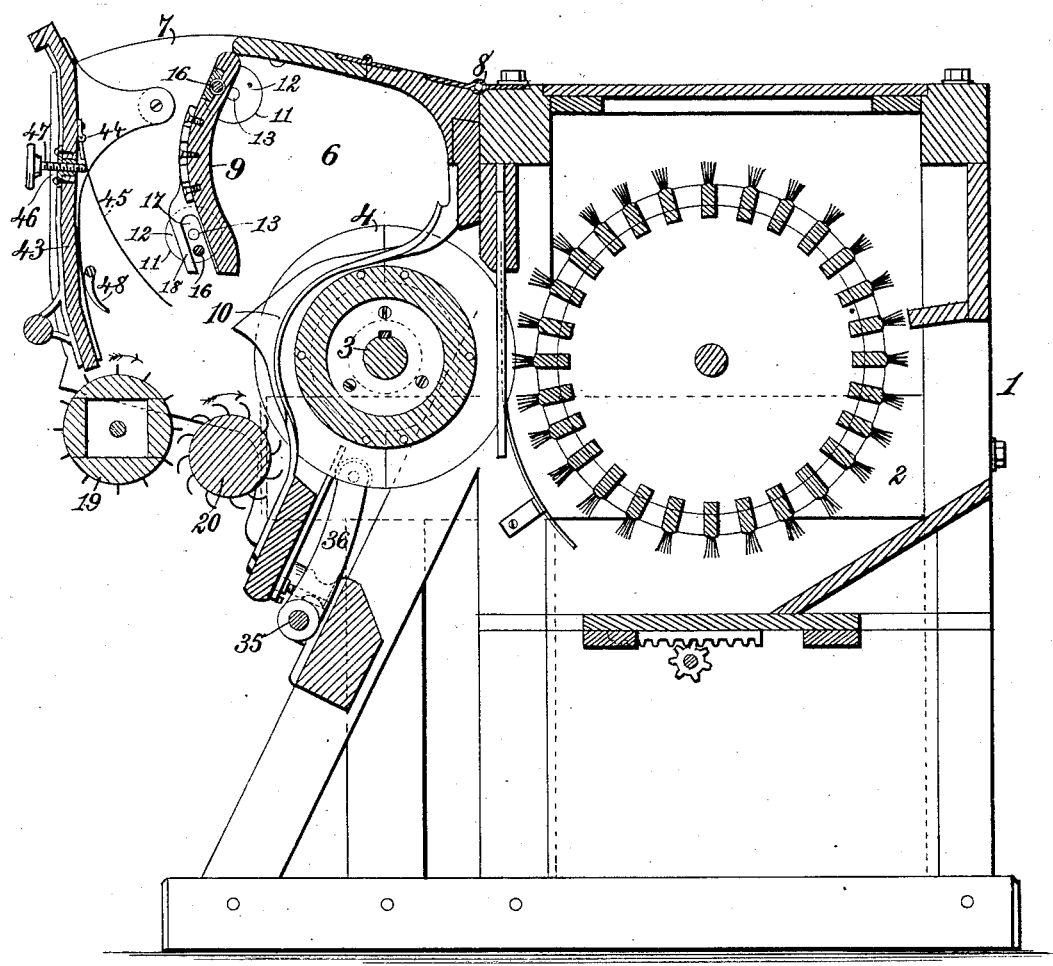
Figure 5:
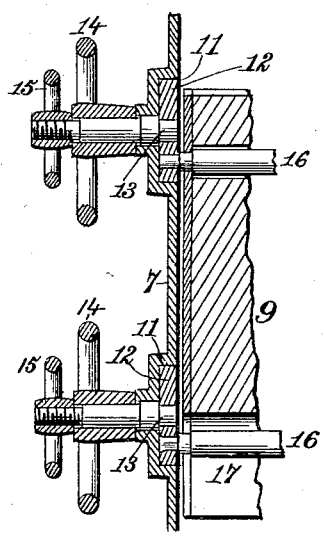
Figure 6:
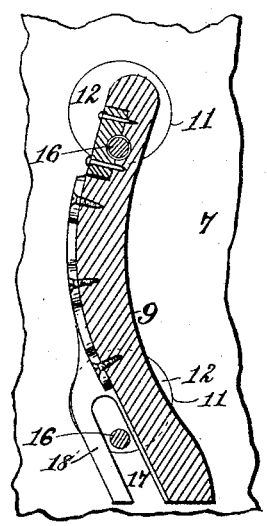
Figure 7:
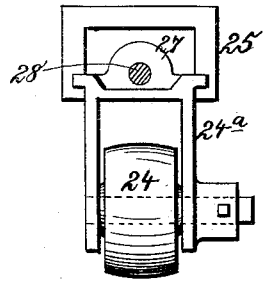
Figure 8:
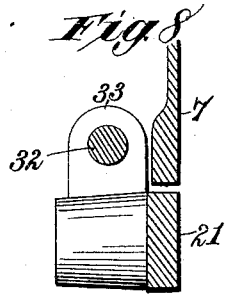
Figure 9:
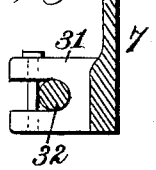

Figure 1 is a front elevation of the machine; Fig. 2, a top plan view thereof; Fig. 3, an end elevation; Fig. 4, a central transverse section of Fig. 1; and Figs. 5, 6, 7, 8, and 9 detail views of parts, hereinafter explained.

In order to enable those skilled in the art to make and use my invention, I will now describe the same in detail, referring to the drawings, wherein the number 1 indicates the frame-work of the machine, and 2 longitudinal beams, at the forward ends of which the shaft 3 of the gin-saws 4 is journaled in boxes 5. The roll-box 6 is composed of side heads, 7, hinged at 8 to the frame-work, a seed-board, 9, extending from head to head, and the gin-ribs 10, or the ribs comprising what I designate as the "gin-breast," secured to the upper and lower cross-bars attached to the gin-heads 7, so that if the heads and roll-box be swung on the hinged connections 8 the ribs or gin-breast moves therewith. The gin-heads are provided with upper and lower recesses, 11, each containing a circular disk, 12, rigidly attached to a stud, 13, having an angular portion carrying a hand-wheel, 14, and a screw-threaded outer end carrying a hand-wheel, 15, which constitutes a jam-nut. To each disk is eccentrically attached one end of a transverse rod, 16, the upper rod passing through the upper portion of the seed-board or through boxes thereon, and the lower rod passing through a slot, 17, formed by a pendent tongue, 18, secured to the seed-board. It will be understood that both ends of each rod 16 are eccentrically secured to rotary disks 12 in the respective gin-heads, and the disks, studs, and rods constitute devices by operating which the seed-board can be moved in any desired direction and securely held in the position to which adjusted by the jam-nuts 15 binding against the hand-wheels 14. The seed-board is hung on the upper rod, 16, to swing on or with the same, and as the lower rod works in the slot 17 it will be obvious that by operating the lower disks, 12, the seed-board can be adjusted to or from the gin-saws. If the seed-board is to be adjusted vertically, the upper jam-nut is loosened and the upper hand-wheel turned in the proper direction, which rotates the upper stud and disk, and after the desired adjustment is effected the jam-nut is tightened up against the hub of the hand-wheel. The lower hand-wheel and jam-nut are operated in a like manner; but since the transverse rod works in the slot 17 the seed-board is simply adjusted to or from the gin-saws, thereby diminishing or increasing the space through which the cotton-seed discharges. The combined movements of the seed-board change the shape or configuration of the roll-box, which is of considerable advantage in adapting the machine to the condition of the cotton operated upon. The toothed hulling-rollers 19 and 20 at the bottom of the gin-heads may be of any ordinary construction, and are both journaled in boxes on a connecting-bar, 21, one at each gin-head, and around a pulley, 22, on the shaft of the hulling-roller 20 passes a flat driving-belt, 23, which in turn passes upward around two pulleys, 24, on a bracket, 24ª, carried by a stationary box or casting, 25, fixed to the frame-work, and thence passes to and around a pulley, 26, on the shaft 3 of the gin-saws. The bracket 24ª constitutes a carrier for the two tightener-pulleys 24, and this carrier has vertical edge flanges arranged to move in guide-grooves in the box or casting 25, (see the detail top plan view, Fig. 7,) said carrier having an attached rearward-projecting threaded lug or nut, 27, engaged by a vertical screw-bolt, 28, in the box or casting, and the upper end of the latter is held by a cap-piece, 29, which affords a bearing for the hand-wheel 30, applied to the upper end of the screw-bolt. By turning this hand-wheel the screw-bolt is rotated, thus moving the pulley-carrier vertically to tighten or loosen the belt. The gin-heads are each provided with a lug, 31, in which is loosely journaled a screw-rod, 32, engaging screw-threaded ears 33 on the connecting-rods 21, the forward end of the screw-rod having a finger-piece, by which it can be turned to cause the ears to traverse the rod, and thereby adjust the hulling-rollers to or from the gin-saws. The lugs 31 are preferably cast as a part of the gin-heads, and constitute collars for the screw-rod, (see the detail view, Fig. 9,) so that the rod can be rotated, but is held against longitudinal movement. The adjustment of the hulling-rollers to and from the gin-saws is advantageous in securing the best results on different grades of cotton.

To the front end of the machine-frame are secured boxes 34, forming journal-bearings for a transverse rock-shaft, 35, having at the ends rigidly-attached lifting-arms 36, each having at its upper extremity a friction-roller to bear against a part of the frame-work composing the gin-breast, said rock-shaft being connected at one end with an upwardly-projecting hand-lever, 37, in such manner that if the latter be swung forward the lifting-arms act on the gin-breast and move it upward from the gin-saws, which is rendered possible by the hinged connections 8 of the frame composing the roll-box. The hand-lever is provided with a rigidly-attached curved bar, 38, extending rearwardly, and having a tooth, 39, to engage a rack-plate, 40, attached to the frame of the machine, and the lever is connected with the rock-shaft by a slot, 41, and pin 42 in such manner that it can be slightly moved sidewise or in a lateral direction to cause the tooth 39 to engage or disengage the rack-plate. If the gin-breast is to be elevated, the hand-lever is tipped sidewise until the tooth 39 disengages the rack-plate, after which the lever is swung forward as far as required to elevate the gin-breast, whereupon the tooth on the lever is caused to engage with the rack-plate to hold the gin-breast in its new position. By lifting the gin-breast more or less the depth or projection of the gin-saws in the roll-box is varied, as is apparent. By swinging the lever sufficiently far the gin-breast can be lifted so that the roll-box clears the gin-saws, and the devices for locking the lever in its adjustments effectually prevents accidental falling of the gin-breast. Thus the gin-breast can be held against falling, and all danger to the operator is avoided if it becomes necessary to introduce the hands into the roll-box while the machine is running. The front breast-board, 43, of the gin is hung by pivots at its upper end, as ordinarily, and is preferably combined with devices by which it can be adjusted forward and backward. To the inner side of this board is hung, by a hinged connection, 44, a curved sheet-metal plate, 45, which is adjustable to and from the seed-board, in order to facilitate the separation of the hulls from the seed-cotton. A screw-nut, 46, is fixed to the breast-board, and an adjusting-screw, 47, passes therethrough and bears against the curved deflecting-plate, so that by rotating the screw the plate is adjusted. The cotton is fed into the gin between the breast-board and the seed-board, and if it is very hully the deflecting-plate is adjusted to discharge the cotton and hulls upon the rear hulling-roller, 20, which carries the same to the gin-saws, the latter taking hold of the fiber of the cotton and carrying it between the gin-ribs into the roll-box, while the hulls are thrown toward and against the breast-board, together with some of the attached cotton. In this case the swinging breast-board should be adjusted, as by cams 48, so that the hulls and attached cotton will fall upon the front hulling-roller, 19, at a point where the hulls will discharge outside, and any cotton that may be in or on them will be again carried forward to the saws by the sharp-pointed teeth of the hulling-rollers. The deflecting-plate not only directs the cotton and hulls upon the rear hulling-roller, but also serves in part to prevent the hulls thrown off by the gin-ribs from coming in contact with the falling cotton.

In ginning very hully cotton the breast-board should be so adjusted that its lower edge will stand a suitable distance above the front hulling-roller and at one side of a vertical axial line therethrough, so that all the hulls will be discharged in front of the roller 19 and the seed discharged between the two rollers and between the rear roller and gin-saws. The hulling-rollers at the ends opposite the driving-belt are geared together, as by a belt, 49, so that they are revolved in the direction of the arrows, Fig. 4. The ends of the transverse rods carrying the seed-board, which are opposite the hand-wheels, are, as stated, eccentrically connected to rotary disks having hand-wheels and jam-nuts; but the latter may be replaced by ordinary bolts and nuts.

It will be obvious that all the adjusting mechanism described is placed under control of the attendant, whereby any of the described adjustments can be effected while the machine is running, which is very desirable and advantageous.

I have shown the hulling-rollers belted to the gin-saw shaft, but do not confine myself thereto, as the hulling-rollers could be belted to some other moving part of the machine.

Having thus described my invention, what I claim is—

1. In a cotton-gin, the combination, with the adjustable hulling-rollers 19 20, the pulley 22, and the saw-shaft having pulley 26, of the vertically-adjustable block or box 24ª, having pulleys 24, and the continuous belt 23, passing around the pulleys 22, 26, and 24, substantially as described.

2. The combination of the hulling-rollers, the belt for driving the same, the vertically-movable carrier, the pulleys on the carrier engaging the belt, and the screw-bolt for moving the carrier, substantially as described.

3. The combination of the hulling-rollers, the gin-saws, the gin-saw shaft, the belt connecting the saw-shaft with one of the hulling-rollers, the vertically-movable carrier, the pulleys on the carrier engaging the belt, the box or casting, and the screw-bolt carried by the latter and engaging the carrier, substantially as described.

4. The combination of the hulling-rollers, the gin-saws, the driving-belt, the carrier having guide-flanges, the pulleys on the carrier, the grooved box or casting guiding the carrier, and the screw-bolt carried by the box or casting and engaging the carrier, substantially as described.

5. The combination, with the gin-saws and roll-box, of the vertically and horizontally adjustable seed-board, the top and bottom cross-shafts, and revolving disks having said shafts fitted eccentrically thereto, and means for locking said disks, substantially as described.

6. The combination, with the seed-board and the roll-box, of rotary disks having eccentric rods for raising and lowering the seed-board and adjusting it backward and forward, substantially as described.

7. The combination, with the seed-board, of a device for adjusting the same, consisting of the upper and lower pairs of rotary disks, the transverse rods eccentrically secured to the disks, the studs projecting from the disks at one side of the roll-box, and the hand-wheels and locking-nuts fitted on said studs, substantially as described.

8. The combination, with the seed-board, of the upper and lower transverse rods, the rotary disks, the studs rigid with the disks, and the hand-wheels on the studs, substantially as described.

9. The combination, with the seed-board, of the upper and lower transverse rods, the rotary disks, the studs connected with the disks, and means for turning and holding the studs, substantially as described.

10. The combination, with the seed-board, of the transverse rods, the rotary disks, the studs secured to the disks, the hand-wheels on the studs, and the jam-nuts for locking the wheels, substantially as described.

11. The combination, with the gin-saws, of the hulling-rollers, the rods connecting the same, and means for adjusting the rods to move the rollers to and from the gin-saws, substantially as described.

12. The combination of the gin-saws, the hulling-rollers, the rods connecting the rollers, and the screws engaging the rods to move the rollers to and from the saws, substantially as described.

13. The combination, with the roll-box, the vertically and horizontally adjustable seed-board, the breast-board, the front and rear hulling-rollers, and the gin-saws, of the curved deflecting-plate extending entirely across the roll-box in the space in front of the seed-board, a hinge-joint for connecting said deflecting-plate to the breast-board, and a set-screw for causing its free lower end to be adjusted to and from the seed-board, substantially as described.

14. The combination, with the vertically-movable gin-breast and roll-box, of the transverse shaft 35, having arms 36, connected with said gin-breast, and the vertical lever 37, having the arm 38, provided with the tooth 39, and loosely-connected with said rock-shaft, and the rack-plate 40, fitted on the frame of the gin, substantially as described.

In testimony whereof I affix my signature in presence of two witnesses.

WILLIAM L. CROWSON.

Witnesses:
R. H. EDMUNDS, Jr.,
R. K. HALE.